US008051311B2

United States Patent
Shi

(10) Patent No.: US 8,051,311 B2
(45) Date of Patent: Nov. 1, 2011

(54) POWER SUPPLY CIRCUIT FOR CENTRAL PROCESSING UNIT

(75) Inventor: Lei Shi, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 771 days.

(21) Appl. No.: 12/177,119

(22) Filed: Jul. 21, 2008

(65) Prior Publication Data

US 2009/0319809 A1  Dec. 24, 2009

(30) Foreign Application Priority Data

Jun. 20, 2008 (CN) .......................... 2008 1 0302251

(51) Int. Cl.
*G06F 1/26* (2006.01)
*G06F 1/32* (2006.01)
(52) U.S. Cl. ........ 713/320; 713/300; 713/323; 713/324; 713/340
(58) Field of Classification Search .................. 713/300, 713/320, 323, 324, 340
See application file for complete search history.

(56) References Cited

U.S. PATENT DOCUMENTS

| 6,691,235 | B1* | 2/2004 | Garcia et al. ................. 713/300 |
| 2005/0154932 | A1* | 7/2005 | Nguyen ........................ 713/300 |
| 2006/0184812 | A1* | 8/2006 | Nguyen et al. ............... 713/300 |
| 2008/0197823 | A1* | 8/2008 | Crowther et al. ............ 323/271 |
| 2008/0238392 | A1* | 10/2008 | Cheung et al. ............... 323/283 |
| 2009/0267578 | A1* | 10/2009 | Luo et al. ..................... 323/272 |

* cited by examiner

*Primary Examiner* — Thomas Lee
*Assistant Examiner* — Jaweed A Abbaszadeh
(74) *Attorney, Agent, or Firm* — Altis Law Group, Inc.

(57) ABSTRACT

A power supply circuit for a CPU includes a first control circuit, a switch circuit, an operational amplifying circuit, and a second control circuit. The first control circuit is connected to a BIOS to receive a CPU identification signal. The switch circuit is connected to the first control circuit, and also connected between a CPU and a PSI pin of a VRM. The operational amplifying circuit is connected to the VRM to receive a current monitor signal output from the VRM. The second control circuit is connected to the operational amplifying circuit, the first control circuit and the PSI pin of the VRM. When the CPU identification signal is at a high level and the current monitor signal output from the VRM is lower than a reference voltage of the operational amplifying circuit, the switch circuit turns off, and the operational amplifying circuit outputs a second control signal to make the PSI pin of the VRM grounded.

16 Claims, 1 Drawing Sheet

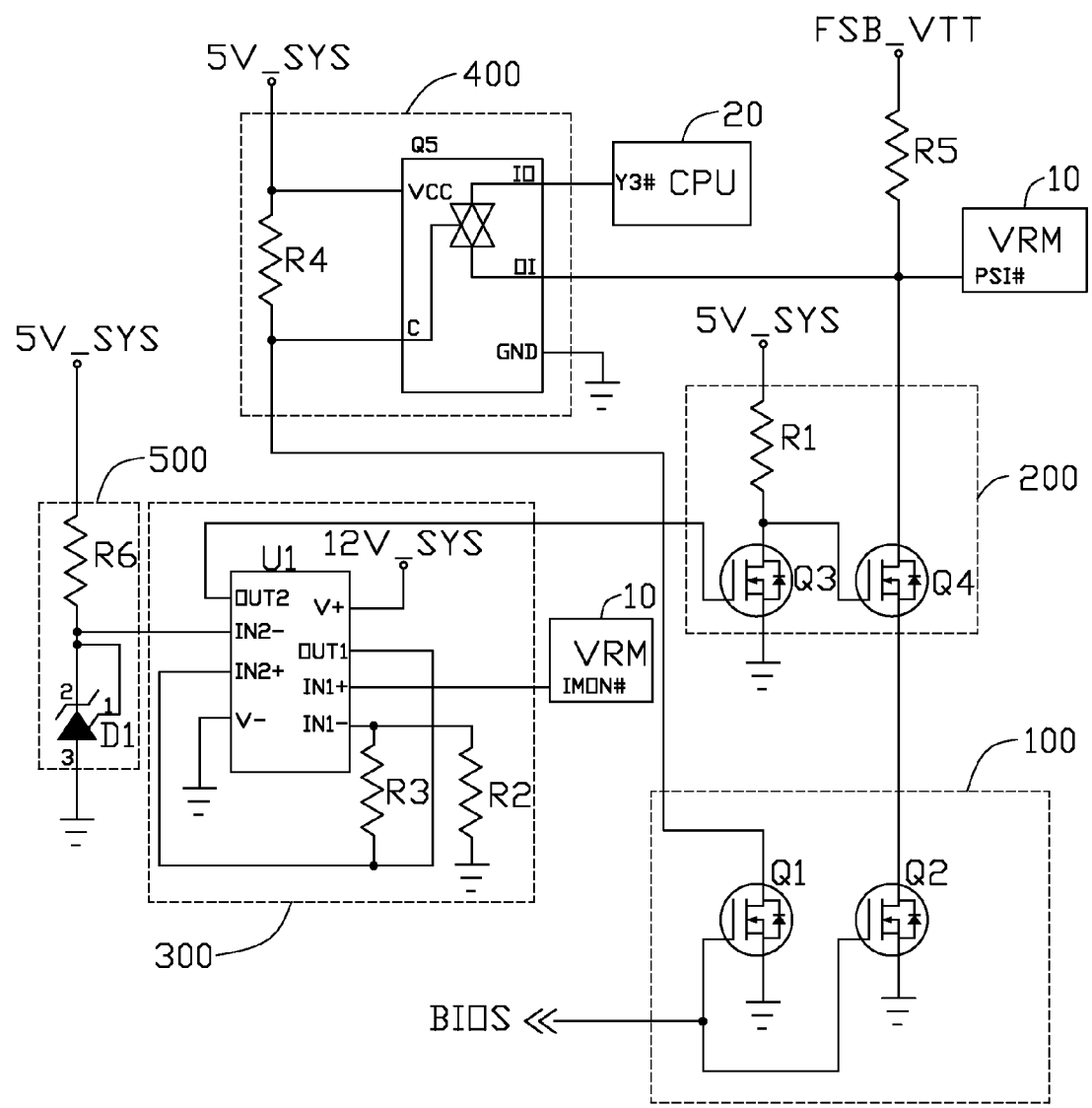

POWER SUPPLY CIRCUIT FOR CENTRAL PROCESSING UNIT

BACKGROUND

1. Field of the Invention

The present invention relates to power supply circuits, and particularly to a power supply circuit for a central processing unit (CPU) in a computer.

2. Description of the Related Art

Energy consumption is an important issue for electronic products, such as personal computers. The CPU consumes a significant portion of the energy needed by a computer, and is therefore a logical target for minimizing energy consumption. The CPU having a power state indication (PSI) function will automatically reduce the voltage at the PSI pin of a voltage regulator module (VRM) in order to change the power supply, for example, from 5-phase to 3-phase when the CPU is idle. However, there are still many kinds of CPUs without the PSI function in the market.

BRIEF DESCRIPTION OF THE DRAWINGS

The drawing is a circuit diagram of an embodiment of a power supply circuit for a CPU in accordance with the present invention.

DETAILED DESCRIPTION

Referring to the drawing, a power supply circuit for a CPU in accordance with an embodiment of the present invention is configured to supply variable power to a CPU 20 via a voltage regulator module (VRM) 10. The power supply circuit for the CPU includes a first control circuit 100, a second control circuit 200, an operational amplifying circuit 300, a switch circuit 400, and a voltage regulating circuit 500.

The first control circuit 100 includes two N type metal oxide semiconductor (NMOS) transistors Q1 and Q2. The gate of the NMOS transistor Q1 is connected to the basic input output system (BIOS) of a computer to receive a CPU identification signal. The drain of the NMOS transistor Q1 is connected to the switch circuit 400, and the source of the NMOS transistor Q1 is grounded. The gates of the NMOS transistor Q1 and Q2 are connected to each other. The drain of the NMOS transistor Q2 is connected to the second control circuit 200, and the source of the NMOS transistor Q2 is grounded.

The second control circuit 200 includes a resistor R1, and two NMOS transistors Q3 and Q4. The gate of the NMOS transistor Q3 is connected to the operational amplifying circuit 300. The drain of the NMOS transistor Q3 is connected to a 5V_SYS power supply via the resistor R1, and the source of the NMOS transistor Q3 is grounded. The gate of the NMOS transistor Q4 is connected to the drain of the NMOS transistor Q3. The source of the NMOS transistor Q4 is connected to the drain of the NMOS transistor Q2. The drain of the NMOS transistor Q4 is connected to a power state indication pin PSI# of the VRM 10. The PSI# pin of the VRM 10 is connected to an FSB_VTT voltage source via a resistor R5, and the FSB_VTT voltage source provides 1.2V voltage.

The operational amplifying circuit 300 includes a double operational amplifier U1, two resistors R2 and R3. The double operational amplifier U1 includes a first input IN1+, a second input IN1−, a third input IN2+, a fourth input IN2−, a first output OUT1, a second output OUT2, a power pin V+, and a ground pin V−. The first input IN1+ is connected to an I-monitor pin IMON# of the VRM 10 in order to receive a current monitor signal which indicates the magnitude of the current of the CPU 20. The second input IN1− is grounded via the resistor R2, and connected to the third input IN2+ via the resistor R3. The fourth input IN2− is connected to the voltage regulating circuit 500. The first output OUT1 is connected to the third input IN2+. The second output OUT2 is connected to the gate of the NMOS transistor Q3. The power pin V+ is connected to a 12V_SYS power supply, and the ground pin V− is grounded.

The switch circuit 400 includes a single bidirectional switch Q5 and a resistor R4. The single bidirectional switch Q5 includes a control pin C, a first I/O pin 10, a second I/O pin OI, a power pin VCC, and a ground pin GND. The control pin C is connected to the drain of the NMOS transistor Q1, and connected to the 5V_SYS power supply via the resistor R4. The first I/O pin 10 is connected to a Y3# pin of the CPU 20. The second I/O pin OI is connected to the PSI# pin of the VRM 10. The power pin VCC is connected to the 5V_SYS power supply, and the ground pin GND is grounded. When the voltage at the control pin C is at a high level, the single bidirectional switch Q5 turns on; when the voltage at the control pin C is at a low level, the single bidirectional switch Q5 turns off.

The voltage regulating circuit 500 includes a resistor R6 and an adjustable zener diode D1. The adjustable zener diode D1 includes a control pin 1, a cathode 2, and a anode 3. The control pin 1 and the cathode 2 are connected. The cathode 2 is connected to the fourth input IN2− of the double operational amplifier U1, and also connected to the 5V_SYS power supply via the resistor R6. The anode 3 is grounded. The voltage regulation circuit 500 provides a reference voltage to the double operational amplifier U1.

The BIOS detects the type of the CPU 20 according to information stored in a specific address of the CPU 20 after the computer is powered on. If the CPU 20 has no PSI function, the BIOS controls the CPU identification signal high level to turn on the NMOS transistors Q1 and Q2. Therefore, the control pin C of the single bidirectional switch Q5 is grounded via the NMOS transistors Q1, and the single bidirectional switch Q5 is turned off, thereby disconnecting the CPU 20 from the VRM 10. The double operational amplifier U1 amplifies the current monitor signal output from the IMON# pin of the VRM 10, and compares it to the reference voltage provided by the voltage regulating circuit 500. When the CPU is idle, the burden of the CPU 20 is reduced, the current monitor signal is lower than the reference voltage. The second output OUT2 of the double operational amplifier U1 outputs a low level voltage signal to turn off the NMOS transistor Q3 and turn on the NMOS transistor Q4. Thus, the PSI# pin of the VRM 10 is grounded via the NMOS transistors Q4 and Q2, and power is saved during idle time, as power supply is changed from 5-phase to 3-phase.

If the CPU 20 has PSI function, the BIOS controls the CPU identification signal low level to turn off the NMOS transistors Q1 and Q2. Therefore, the voltage at the control pin C of the single bidirectional switch Q5 is a high level voltage, the single bidirectional switch Q5 is turned on, and the CPU 20 and the VRM 10 are connected to each other. The source of the NMOS transistor Q4 is disconnected from ground due to the NMOS transistor Q2 being turned off. Thereby the voltage signal output from the double operational amplifier U1 cannot be sent to the PSI# pin of the VRM10 via the NMOS transistors Q3 and Q4. However, the CPU with PSI function can sense changes in the current. When the computer is idle, the current of CPU 20 is lower than a determined value, and the CPU 20 controls the Y3# pin to output a low level voltage, which pulls down the voltage at the PSI# pin of the VRM 10 via the single bidirectional switch Q5. Thereby power is saved during idle time.

In summary, the power supply circuit for the CPU controls the first control circuit 100 to output different signals according to the CPU identification signal. When the CPU identification signal is at a high level, the first control circuit 100 outputs a low level voltage as a first control signal to turn off the switch circuit 400; when the computer is idle, the operational amplifying circuit 300 outputs a lower level voltage as a second control signal. The first control signal and the second control signal make the PSI# pin of the VRM10 grounded via the first control circuit 100 and the second control circuit 200, which makes the number of the power supply phase provided by the VRM 10 decrease to achieve energy savings. Otherwise, when the CPU identification signal is at a low level, the first control circuit 100 outputs a high level voltage as a third control signal to turn on the switch circuit 400. When the computer is idle, the CPU20 pulls down the voltage at the PSI# pin of the VRM10 via the switch circuit 400 to achieve energy savings.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply circuit for a central processing unit (CPU), comprising:
    a first control circuit connected to the basic input output system (BIOS) of a computer to receive a CPU identification signal; a switch circuit connected to the first control circuit, and also connected between a CPU and a voltage regulator module (VRM), the VRM comprising a VRM power state indication (PSI) pin connected to a high level voltage source;
    an operational amplifying circuit connected to the VRM to receive a current monitor signal; and
    a second control circuit connected to the operational amplifying circuit, the first control circuit, and the VRM;
    wherein upon a condition that the CPU identification signal is at a high level and the current monitor signal output from the VRM is lower than a reference voltage of the operational amplifying circuit, the first control circuit is capable of outputting a first control signal to turn off the switch circuit, and the operational amplifying circuit is capable of outputting a second control signal to the second control circuit to ground the VRM PSI pin;
    upon a condition that the CPU identification signal is at a low level and the current of the CPU is lower than a determined value, the first control circuit is capable of outputting a third control signal to turn off the switch circuit, and the CPU is capable of outputting a low level voltage signal to the VRM PSI pin via the switch circuit.

2. The power supply circuit as claimed in claim 1, wherein the operational amplifying circuit is connected to a voltage regulating circuit which provides the reference voltage, the voltage regulating circuit comprises a zener diode comprising:
    a diode cathode connected to the operational amplifying circuit, and a system power via a resistor; and
    a diode anode grounded.

3. The power supply circuit as claimed in claim 2, wherein the zener diode is an adjustable zener diode further comprising a diode control pin connected to the diode cathode.

4. The power supply circuit as claimed in claim 1, wherein the first control circuit comprises a first N type metal oxide semiconductor (NMOS) transistor and a second NMOS transistor, the first NMOS transistor comprising:
    a first gate connected to the BIOS to receive the CPU identification signal;
    a first drain connected to the switch circuit; and
    a first source grounded; and
the second NMOS transistor comprising:
    a second gate connected to the first gate;
    a second drain connected to the second control circuit; and
    a second source grounded.

5. The power supply circuit as claimed in claim 1, wherein the second control circuit comprises a first NMOS transistor and a second NMOS transistor, the first NMOS transistor comprising:
    a first gate connected to the operational amplifying circuit;
    a first drain connected to a system power via a resistor; and
    a first source grounded; and
the second NMOS transistor comprising:
    a second gate connected to the first drain;
    a second drain connected the VRM PSI pin; and
    a second source connected to the first control circuit.

6. The power supply circuit as claimed in claim 1, wherein the operational amplifying circuit comprises a double operational amplifier comprising:
    a first input connected to an I-monitor (IMON) pin of the VRM in order to receive a current monitor signal which indicates the magnitude of the current of the CPU;
    a second input grounded via a first resistor;
        a third input connected to the second input via a second resistor;
        a fourth input connected to a voltage regulating circuit which provides the reference voltage;
        a first output connected to the third input;
        a second output connected to the second control circuit;
        a power pin connected to a system power; and
        a ground pin grounded.

7. The power supply circuit as claimed in claim 1, wherein the switch circuit comprises a single bidirectional switch comprising:
    a control pin connected to the first control circuit, and a system power via a resistor;
    a first I/O pin connected to the CPU;
    a second I/O pin connected to the VRM PSI pin;
    a power pin connected to the system power; and
    a ground pin grounded.

8. A power supply circuit for a central processing unit (CPU), comprising:
    a first control circuit connected to a basic input output system (BIOS) of a computer to receive a BIOS control signal;
    an operational amplifying circuit connected to a voltage regulator module (VRM) to receive a current monitor signal, the VRM comprising a VRM power state indication (PSI) pin connected to a high level voltage source; and
    a second control circuit connected to the operational amplifying circuit, the first control circuit, and the VRM;
    wherein upon the condition that the first control circuit receives the BIOS control signal from the BIOS and the current monitor signal output from the VRM is lower than a reference voltage of the operational amplifying circuit, the first control circuit is capable of outputting a first control signal to the second control circuit, and the operational amplifying circuit is capable of outputting a second control signal to the second control circuit, then the second control circuit is capable of outputting a third control signal to ground the VRM PSI pin according to the first control signal and the second control signal.

9. The power supply circuit as claimed in claim 8, wherein the operational amplifying circuit is connected to a voltage regulating circuit which provides the reference voltage, the voltage regulating circuit comprises a zener diode comprising:
  a diode cathode connected to the operational amplifying circuit, and a system power via a resistor; and
  a diode anode grounded.

10. The power supply circuit as claimed in claim 9, wherein the zener diode is an adjustable zener diode further comprising a diode control pin connected to the diode cathode.

11. The power supply circuit as claimed in claim 8, wherein the first control circuit comprises an N type metal oxide semiconductor (NMOS) transistor comprising:
  a gate connected to the BIOS to receive the BIOS control signal;
  a drain connected to the second control circuit; and
  a source grounded.

12. The power supply circuit as claimed in claim 8, wherein the second control circuit comprises a first NMOS transistor and a second NMOS transistor, the first NMOS transistor comprising:
  a first gate connected to the operational amplifying circuit;
  a first drain connected to a system power via a resistor; and
  a first source grounded; and
the second NMOS transistor comprising:
  a second gate connected to the first drain;
  a second drain connected the VRM PSI pin; and
  a second source connected to the first control circuit.

13. The power supply circuit as claimed in claim 8, wherein the operational amplifying circuit comprises a double operational amplifier comprising:
  a first input connected to an I-monitor (IMON) pin of the VRM in order to receive a current monitor signal which indicates a magnitude of a current of the CPU;
  a second input grounded via a first resistor; a third input connected to the second input via a second resistor;
  a fourth input connected to a voltage regulating circuit which provides the reference voltage;
  a first output connected to the third input; a second output connected to the second control circuit; a power pin connected to a system power; and
  a ground pin grounded.

14. A power supply circuit for a central processing unit (CPU), comprising:
  a first control circuit connected to the basic input output system (BIOS) of a computer to receive a BIOS control signal;
  a switch circuit connected to the first control circuit, and also connected between a CPU and a voltage regulator module (VRM), the VRM comprising a VRM power state indication (PSI) pin connected to a high level voltage source;
  wherein upon a condition that the first control circuit receives the BIOS control signal, the first control circuit is capable of outputting a first control signal to turn on the switch circuit, and the CPU is capable of outputting a low level voltage signal to the VRM PSI pin via the switch circuit when the CPU is idle.

15. The power supply circuit as claimed in claim 8, wherein the first control circuit comprises an N type metal oxide semiconductor (NMOS) transistor comprising:
  a first gate connected to the BIOS to receive the CPU identification signal;
  a first drain connected to the switch circuit; and
  a first source grounded.

16. The power supply circuit as claimed in claim 1, wherein the switch circuit comprises a single bidirectional switch comprising:
  a control pin connected to the first control circuit, and a system power via a resistor;
  a first I/O pin connected to the CPU;
  a second I/O pin connected to the VRM PSI pin;
  a power pin connected to the system power; and
  a ground pin grounded.

* * * * *